United States Patent
Besling et al.

(10) Patent No.: US 8,830,656 B2
(45) Date of Patent: Sep. 9, 2014

(54) HIGH DENSITY CAPACITOR

(75) Inventors: Wim Besling, St Nazaire les Eymes (NL); Klaus Reimann, Eindhoven (NL)

(73) Assignee: NXP, B.V., Eindhoven (NL)

( * ) Notice: Subject to any disclaimer, the term of this patent is extended or adjusted under 35 U.S.C. 154(b) by 265 days.

(21) Appl. No.: 13/149,849

(22) Filed: May 31, 2011

(65) Prior Publication Data

US 2011/0292574 A1 Dec. 1, 2011

(30) Foreign Application Priority Data

Jun. 1, 2010 (EP) .................................... 10164669

(51) Int. Cl.
*H01G 9/02* (2006.01)
*H01G 9/04* (2006.01)
*H01G 9/145* (2006.01)
*H01G 9/28* (2006.01)
*H01G 9/042* (2006.01)
*H01M 10/0525* (2010.01)

(52) U.S. Cl.
CPC .................. *H01G 9/042* (2013.01); *H01G 9/28* (2013.01); *H01M 10/0525* (2013.01)
USPC ............................. 361/525; 361/528; 361/532

(58) Field of Classification Search
USPC .......................... 361/523, 524, 525, 528, 532
See application file for complete search history.

(56) References Cited

U.S. PATENT DOCUMENTS

| | | | | |
|---|---|---|---|---|
| 4,737,424 A | * | 4/1988 | Tobishima et al. | 429/331 |
| 5,338,625 A | | 8/1994 | Bates et al. | |
| 6,168,884 B1 | * | 1/2001 | Neudecker et al. | 429/162 |
| 8,192,789 B2 | * | 6/2012 | Albano et al. | 427/115 |
| 2001/0032666 A1 | * | 10/2001 | Jenson et al. | 136/256 |
| 2002/0093029 A1 | | 7/2002 | Ballantine et al. | |
| 2003/0107852 A1 | * | 6/2003 | Chen | 361/15 |
| 2004/0087100 A1 | | 5/2004 | Gousev et al. | |
| 2005/0147877 A1 | * | 7/2005 | Tarnowski et al. | 429/162 |
| 2006/0194113 A1 | * | 8/2006 | Okada et al. | 429/231.9 |
| 2006/0216589 A1 | * | 9/2006 | Krasnov et al. | 429/175 |
| 2007/0285246 A1 | * | 12/2007 | Koyama | 340/572.1 |
| 2008/0123383 A1 | * | 5/2008 | Shionoiri | 363/127 |
| 2008/0241693 A1 | * | 10/2008 | Fukuchi et al. | 429/231.1 |
| 2009/0065042 A1 | * | 3/2009 | Reynolds | 136/244 |
| 2009/0311133 A1 | * | 12/2009 | Pang et al. | 422/22 |

FOREIGN PATENT DOCUMENTS

| | | |
|---|---|---|
| EP | 1 693 866 A1 | 8/2006 |
| WO | 2005/027245 A2 | 3/2005 |
| WO | 2005/067645 A2 | 7/2005 |

OTHER PUBLICATIONS

Klee, M. et al. "Ferroelectric and Piezoelectric Thin Films and their Applications for Integrated Capacitors, Piezoelectric Ultrasound Transducers and Piezoelectric Switches", IOP Conf. Series: Materials Science and Engineering, pp. 1-12, (Aug. 1, 2008).

Hoogeland, D. et al. "Plasma-Assisted ALD of TiN/$Al_2O_3$ Stacks for MIMIM Trench Capacitor Applications", ECS Transactions, pp. 389-397 (2009).

(Continued)

*Primary Examiner* — David M Sinclair

(57) ABSTRACT

A high density capacitor 12, a method of manufacturing it, and applications of it are described. The capacitor 12 is an electrochemical capacitor using a metal ion accepting cathode 22 and a metal ion accepting anode 26 and a amorphous solid electrolyte 24 between. The cathode and anode may be of amorphous lithium ion intercalating material such as suitable transition metal oxides with multiple oxidation states.

20 Claims, 3 Drawing Sheets

(56) References Cited

OTHER PUBLICATIONS

Conway, B. "Electrochemical Capacitors Their Nature, Function, and Applications", Retrieved from the internet at: http://electrochem.cwru.edu/encycl/art-c03-elchem-cap.html, 14 pgs, (2011).

Extended European Search Report for Patent Appln. No. 10164669.3 (Feb. 14, 2011).

Carr, Joseph J., "Secrets of RF Circuit Design," Tab Electronics Series, Ed. 3, McGraw-Hill Professional, 2000, ISBN 0071370676, 9780071370677, p. 421.

* cited by examiner

HIGH DENSITY CAPACITOR

This application claims the priority under 35 U.S.C. §119 of European patent application no. 10164669.3, filed on Jun. 1, 2010, the contents of which are incorporated by reference herein.

The invention relates to a high density capacitor, a method of manufacturing it, and applications of it.

BACKGROUND OF THE INVENTION

A general trend is the miniaturization of components. In terms of capacitors, new technologies have been developed to integrate thin-film capacitors with high capacitance densities on silicon chips. Two main technology routes are followed: trench capacitors or complex oxide capacitors such as ferroelectric capacitors. Both capacitor types are suited for radio frequency (RF) decoupling. But the capacitors are still not small enough to integrate μF capacitor values on a reasonably small area.

Conventional integrated capacitors store the electrical energy as charge on two parallel plates placed sufficiently close together. Using the parallel plate capacitor concept there are three ways to increase the capacitance density: i.e. reduce the spacing between the parallel plates, increase the dielectric constant of the dielectric material, or increase the surface area (i.e. fold the 2-dimensional capacitor into a 3D space). Bearing in mind present-day requirements for leakage current, breakdown voltage, and reliability, the state of the art does not allow to further decrease the dielectric thickness, or further increase the dielectric constant. Moreover, the dielectric deposition in 3D structures is not trivial and adds significantly to the manufacturing costs of these devices.

Some applications, e.g., supply line decoupling or pulsed operation modes, require large capacitor values. The large values cannot be integrated easily. For instance, a three dimensional MIM capacitor with a 20× surface enlargement can reach a maximum capacitance density of 200 $nF/mm^2$ with an erbium doped $HfO_2$ high-k material and a dielectric thickness of 10 nm. Note that "three dimensional" refers to a capacitor with a surface structured, e.g., using a trench structure, to have a capacitor electrode area greater than the area that the capacitor covers on the substrate surface. Thinner films cannot be applied to avoid excessive leakage currents and early breakdown. For a voltage range of 2.0 V the total amount of usable charge of such a capacitor is 0.4 $\mu C/mm^2$ or 0.11 $nWh/mm^2$.

A possible technology to manufacture ultra-high density capacitors (>1 $\mu F/mm^2$) is electrochemical capacitors. Electrochemical capacitors store the energy by moving ions in electric double layers or store electrical energy as chemical energy by means of redox reactions.

Typically, such electrochemical capacitors use electrodes of activated carbon and an electrolyte. A two dimensional (flat electrodes) electrochemical capacitor with a cathode thickness of 100 nm has a capacity of 45 $nWh/mm^2$ or 0.6 $mC/mm^2$, i.e. a more than 1000× larger energy density than conventional capacitors.

Although the energy storage can be increased by more than 3 orders of magnitude using such an electrochemical capacitor compared to more conventional capacitors, since the volume determines the storage capacity not the surface area, the release of the energy is limited due to the fact that the internal resistance is high i.e. ions should move from one electrode to the other.

Further, electrochemical capacitors use liquid or gelled electrolytes and electrode materials with relatively slow ion conduction. Therefore, the capacitance will drop significantly at high frequencies. The decoupling potential decreases and the maximum charging or discharging current is limited by the ion conductivity. Moreover the stability at high temperatures is limited due to the usage of liquid/polymeric electrolytes which blocks integration on chip. Therefore, standard electrochemical capacitors cannot replace the existing high-k capacitors, resulting in extra area and cost, when they are combined.

An alternative to electrochemical capacitors for charge storage in some applications is battery technology, for example lithium ion battery technology. In such technology, lithium ions are used as the means for electric transport through an electrolyte. Typically, the anode and cathode of a lithium ion battery use lithium ion intercalating technology, as illustrated schematically in FIG. 1. In this arrangement, lithium ions are intercalated into the matrix of the anode and the cathode.

FIG. 1 shows a cathode of an electrochemical capacitor showing two states, one (the left) having no lithium ions embedded and one (the right) having lithium ions embedded. The matrix is a metal oxide with metal atoms 2 and oxygen atoms 4 and gaps 6 which can accept lithium ions. These lithium ions 8 are shown intercalated in the right hand of FIG. 1. FIG. 1 is a schematic drawing with extreme states. Typically the lithium ions are not fully removed, but a fraction stays in the lattice.

However, lithium ion batteries are not capacitors and cannot be used in all applications. In particular, lithium ion batteries have discrete voltage outputs—unlike a capacitor, the voltage across a battery is not a smooth function of the charge stored. Instead, if the voltage across the battery is plotted as a function of charge, the plot has well defined plateaus, for example a plateau at 3.4 V. A comparative example is presented below (FIG. 4) which shows such a plateau. Of course, for a battery application such a plateau gives a relatively constant output voltage which is desirable in a battery, but such a plateau is not suitable for a capacitor.

Accordingly, there remains a need for a design of electrochemical capacitor that can be manufactured on a silicon substrate and not as a large discrete component, together with a corresponding manufacturing method.

SUMMARY OF THE INVENTION

According to a first aspect of the invention there is provided an electrochemical capacitor with a cathode; an anode; and a solid state electrolyte allowing migration of metal ions between the anode and the cathode; wherein at least one of the anode and cathode is formed of a compound of a transition metal with multiple oxidation states, the compound of a transition metal with multiple oxidation states being a non-crystalline material, an amorphous material, and/or a material with a defective structure.

The anode and/or cathode may be of a lithium intercalating material which is a material that absorbs lithium or lithium ions within its structure. Such materials have been developed in particular for lithium ion battery technology. Such lithium ion batteries are however not suited for high frequency decoupling because the discharge/charge rate is relatively small compared to standard parallel plate capacitors.

A lithium ion battery may use crystalline $V_2O_5$ as a Li intercalating material. Such a material has a voltage plateau at 3.4V, i.e. generates a voltage of 3.4V for a range of amounts of Li ions incorporated. With the addition of a half layer of lithium ions, the $V_2O_5$ enters another state with a voltage of 3.0V. Such fixed voltage outputs as a function of charge are of course very useful in a battery, but are not suitable for a capacitor.

Accordingly, the Li intercalating material is preferably non-crystalline and/or amorphous, in use, since the use of such material reduces or eliminates the discrete voltage steps.

The use of non-crystalline materials also allows lower temperature processing to be performed, since forming good crystalline layers of Li intercalating material usually requires annealing (temperatures typically above 500° C.). Thus, the thermal budget of the proposed solid state electrochemical capacitor is relatively low, easing integration. Hence, it is possible to deposit such a structure on top of a CMOS device. CMOS processes generally require temperatures after formation of the CMOS devices not to exceed 400° C. or 450° C. to avoid damage to the underlying CMOS layers. This is achievable upon using amorphous materials.

The full solid state electrochemical capacitor increases the capacitance density of the integrated devices compared with dielectric based capacitors. A full solid state device may withstand high-temperatures during manufacturing, it can be processed with standard lithographic and semiconductor proven technologies, and it can be deposited on top of CMOS. The use of a solid electrolyte ensures that the electrolyte won't leak away which makes it an inherently safer product, and that the electrolyte material and interfaces won't degrade as quickly as a liquid electrolyte would do.

An extremely large capacitance density can be achieved by the all-solid-state electrochemical capacitor based upon the reversible exchange of lithium ions between two electrodes (anode and cathode), which are separated by a solid-state electrolyte, that allows for Li-ion diffusion-migration and prevents electron transport.

In addition, diffusion barrier layers may be provided to prevent the diffusion of lithium species from the electrodes into the substrate. These barrier layers (possibly combined with a current collector) should allow for (external) electron transport from anode (negative electrode) towards cathode (positive electrode) during discharge (and vice versa during charge).

The capacitance is determined by the electrodes and so the thickness of the electrolyte can be adjusted. In embodiments, the thickness of the amorphous solid state electrolyte is 0.5 µm to 10 µm. Smaller thicknesses, for example 0.5 µm to 1 µm improve the high frequency performance. Larger thicknesses, for example 5 µm to 10 µm, improve the resistance of the device to electrostatic discharge.

In another aspect, the invention relates to a device with an electrochemical capacitor and a dielectric capacitor formed on a common substrate. The dielectric capacitor may have a capacitance density above 10 nF/mm$^2$. The dielectric layer of the dielectric capacitor may have a dielectric permittivity above 20. Alternative dielectric layers may also be used.

BRIEF DESCRIPTION OF THE DRAWINGS

For a better understanding of the invention embodiments will now be described, with reference to the accompanying drawings, in which.

DETAILED DESCRIPTION OF EMBODIMENTS

Figure 2:
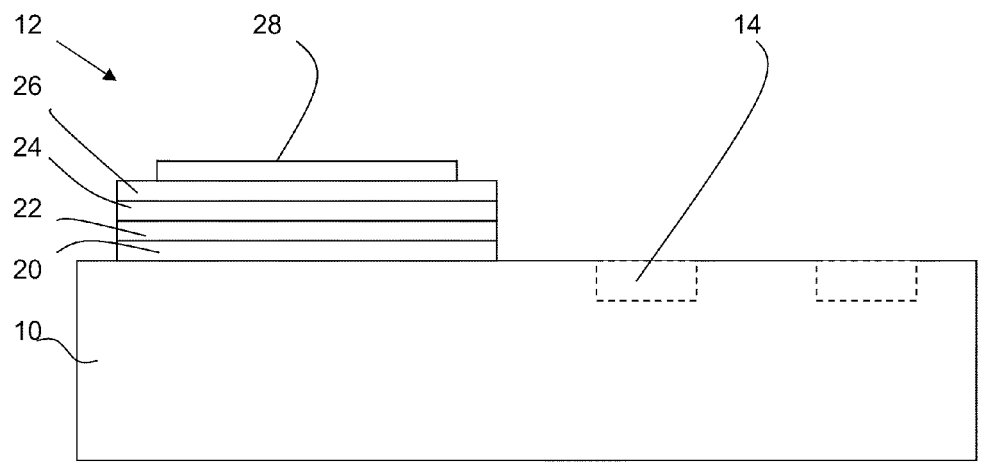
FIG. 2 shows an embodiment of the invention.

FIG. 2 shows a first embodiment of an electrochemical capacitor arrangement according to the invention.

A semiconductor substrate 10 has an electrochemical capacitor 12 formed on the same substrate as semiconductor devices 14. Note that the electrochemical capacitor also works stand-alone on other substrates 10 without semiconductor devices.

The electrochemical capacitor comprises a diffusion barrier layer 20, which may also function as an adhesion layer and/or a protection layer or even a current collector layer to avoid high Ohmic current paths. In the example shown, this diffusion barrier layer 20 is provided on a layer of silicon dioxide (not shown) on the substrate surface but in alternative embodiments the diffusion barrier layer 20 may be formed on the substrate.

Suitable materials for the diffusion barrier layer include titanium nitride (TiN), titanium oxide ($TiO_2$), aluminium oxide ($Al_2O_3$), tantalum oxide ($TaO_x$) or tantalum nitride (TaN).

Figure 1:
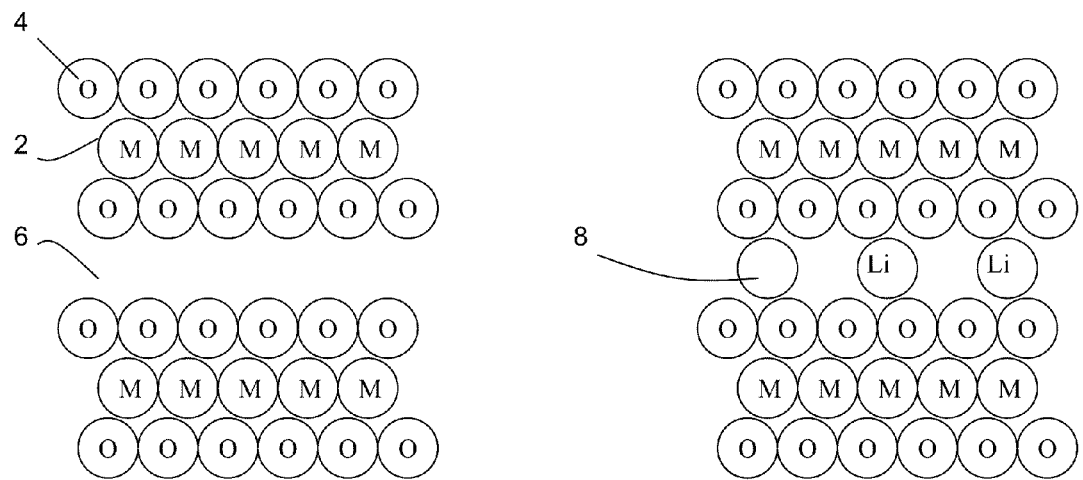
FIG. 1 shows an example cathode used in a conventional lithium battery.

A lower electrode 22 is provided on the diffusion barrier layer 20. This forms the cathode and has a layer of Li intercalating material as illustrated in FIG. 1. The material of the lower electrode has multiple oxidation states; further, the material is amorphous or disordered or contains a high number of crystal lattice defects. Suitable material choices include amorphous vanadium oxide, $V_2O_5$ or tungsten oxide, $WO_3$.

Please note that the use of such stochiometric formulae in this text does not imply that the material needs to have exactly the stochiometric formula.

By avoiding the use of ordered, crystalline material the material no longer has the discrete well defined redox potentials that may be achieved in Li-ion battery technology. Instead, the material displays a broad, continuous distribution of redox potentials.

This is not intended to mean that the material has no well defined structure nor well defined composition whatsoever at the potential of the lower electrode 22 as a function of charge, but simply that it should not have the well defined plateaus typical of Li-ion battery electrodes.

In the embodiment described, the lower electrode is amorphous to achieve this result. However, the same result may be achieved in other systems that are not strictly amorphous. For example, disorder may be introduced by doping a compound with a further element. Alternative ways of achieving defective lattice structures may be used. A further possibility to broaden the range of redox potentials is to use multiple elements each of which may have multiple states.

Thus, multiple non-discrete oxidation states of the lower electrode may arise due to the use of transition metal elements that have multiple oxidation states (like V and W), non-crystallinity, short range order in the crystal lattice, doping with foreign elements, creation of defective lattice structures, and oxides that incorporate multiple elements that have two oxidation states (e.g. an oxide containing three metals such as $LiCoMnO_x$) and or a combination of the before mentioned cases.

A solid state electrolyte 24 is provided on the lower electrode 22. The solid state electrolyte allows fast diffusion/migration of lithium ions in an electrical field while blocking electronic conduction. Possible materials are: lithium titanate, $Li_4Ti_5O_{12}$, lithium tantalate, $LiTaO_3$, or lithium niobate, LiNbO$_3$, lithium phosphorus oxide, LiPO, or lithium phosphorus oxynitride (LiPON: Li$_{2.9}$PO$_{3.3}$N$_{0.36}$).

An upper electrode 26, here the anode, is formed on the solid state electrolyte. This material can either be identical to the cathode, the material can have an oxidation state different to the cathode, or a different Li intercalating material with a different redox potential than the cathode may be used. Examples of the latter include Lithium Transition Metal Phosphates LiMPO$_4$ (M=Fe, Mn, Co, Ni) or Lithium Transition Metal Oxides LiM$_x$O$_y$ (M=Mn, Co, Ni). A further possibility is that the upper electrode is a plating anode on which metallic Li is deposited during charging. In this case, the upper electrode may be of Cu or Bi.

A current collector 28 is provided on the anode. Alternatively or additionally a current collector (not shown) may be provided below the cathode.

Additional cover, encapsulation or protection layers may be provided and also additional interconnect layers for the electrical signal routing or encapsulation (not shown in the figure).

The total stack thickness 20-26 depends on the required capacitance density but is typically in the order of 0.1 to 5.0 µm, for example around 0.5 to 1.0 µm.

In the embodiment described, the diffusion barrier layer 20 has a thickness of 0.1 µm, the cathode 22 a thickness 0.1 µm, the solid state electrolyte 24 a thickness of 0.1-0.9 µm, preferably 0.1 to 0.7 µm, further preferably 0.3 to 0.7 µm, yet further preferably 0.4 to 0.6 µm, the anode 26 a thickness of 0.1 µm anode and a 0.1 µm thick current collector.

In particular, the thickness of the electrolyte 24 may be less than in designs of batteries since the issue of leakage current is much less important for a capacitor than a battery. In typical batteries, the electrolyte must be at least 1.0 µm thick to minimise leakage and in particular ensure sufficient charge retention.

The skilled person will realise that the voltage range depends on the redox couple and can be adapted using different chemistries. The material stack mentioned above is just meant as a typical example.

The cathode and/or anode material(s) may be a compound of the transition metal and a group VI A element such as oxygen. The materials may also be another compound of the transition metal, such as a phosphate. In particular, the cathode and/or anode may be a metal oxide such as a nickel oxide, a cobalt oxide, a titanium oxide, an iron oxide, a vanadium oxide, a manganese oxide, a molybdenum oxide, a chrome oxide or a tungsten oxide are a combination thereof in a composite oxide. Such a composite oxide is exemplified by LiMn$_{2-x}$, M$_x$O$_4$ or LiCo$_x$Mi$_{1-x}$O$_2$ where M=Fe, Mn, Co, Ni.

Many electrolyte chemistries have been investigated so far for rechargeable thin-film Li-ion batteries. They include Li$_2$S—P$_2$S$_5$—LiI, Li$_2$—S—SiS$_2$—LiI, Li$_2$—S-SiS$_2$—Li$_3$PO$_4$, Li$_2$O—P$_2$O$_5$—Li$_2$SO$_4$, Li$_2$O—B$_2$O$_3$—LiI, Li$_2$O—Al$_2$O$_3$—B$_2$O$_3$, Li$_2$O—Al$_2$O$_3$—SiO$_2$, Li$_2$O—SiO$_2$—B$_2$O$_3$, and lithium phosphorous oxynitride LiPON.

LiPON electrolytes have been extensively investigated for thin-film Li/Li-ion battery applications, and are widely used in thin film Li/Li-ion batteries because they do not decompose when in contact with a lithium anode. They also possess a relatively high Li-ion conductivity in the 10$^{-6}$-10$^{-7}$ S/cm range. Since the ionic conductivity of amorphous LiPON films is generally more isotropic and higher than that of crystalline films, amorphous LiPON films are preferred for solid electrolyte applications.

To manufacture the device as a planar device as illustrated in FIG. 2 the embodiment uses a manufacturing process that forms the whole material stack by deposition using Physical Vapor Deposition (PVD). This eases manufacturing. Suitable PVD techniques include sputtering, evaporation, electron beam physical vapour deposition, and others. Radio frequency (RF) sputtering has been found to be particularly suitable.

The "patterning" can be done either by sputtering through a shadow mask or by photolithographic techniques followed by selective dry etching. Care needs to be taken with the patterning/deposition of the solid state electrolyte as some of the lithium containing electrolyte films are hygroscopic and unstable in air. Accordingly, in a preferred manufacturing method, these materials are processed under argon or nitrogen gas environment.

In the embodiment described, all of the layers are deposited using radio frequency sputtering through a shadow mask, i.e. depositing the layer through the mask so that each layer is only deposited where required.

For reduced sensitivity to environmental conditions the LiNbO$_3$ and the LiTaO$_3$ solid state electrolytes have significant advantages although their lithium ion conductivity is much smaller than of LiPON. However, as rather thin electrolyte layers can be used, the smaller ion conductivity can be mitigated by applying a much thinner film; this is in contrast with lithium ion batteries where charge retention is critical and minimum electrolyte thicknesses of about 1 µm are employed. For instance, LiPON with a N/O ratio as small as 0.1, has an ionic conductivity of 1 to 2 10$^{-6}$ S/cm. In contrast, the lithium ion conductivity in crystalline lithium niobate and lithium tantalate is 10$^{-12}$ S/cm at 25° C. which is 6 orders of magnitude lower. Conductivity can be significantly increased if amorphous lithium niobate and lithium tantalite films are employed: the ion conductivity is then measured to be 10$^{-8}$ S/cm. If sufficiently thin films are employed the negative impact on impedance can be reduced.

The big advantage of LiPON compared to other lithium electrolytes is its good thermal and chemical stability especially in contact with metallic lithium. In addition, the electronic resistivity of LiPON is very high, greater than 10$^{14}$ Ωcm and is not altered upon Li+ diffusion or in contact with metallic lithium.

If other electrolyte materials are selected care should be taken that a lithium intercalating material is used on both sides of the electrolyte. Typically from battery power perspective this would be a disadvantage because the maximum output voltage of the device is reduced but from capacitor perspective there is sufficient margin to use other lithium intercalating material combinations.

In the series of lithium titanate, Li$_4$Ti$_5$O$_{12}$, lithium tantalate, LiTaO$_3$, or lithium niobate, LiNbO$_3$, the intrinsic stability of the electrolyte layer diminishes. This means that the anode should be kept at a certain minimum voltage to avoid intercalation of Li+ into the lattice: this would not only result in a dramatic increase in the electronic conductivity but this effect would also be irreversible. In practice this means that a plating or insertion anode cannot be used if these electrolytes are being employed. For example, a Bi as anode has a redox potential of 0.9V whereas the lithium tantalate, LiTaO$_3$ is only stable above 1.5V.

Hence, in one embodiment the solid state electrochemical capacitor consists of an amorphous transition metal oxide with a metal in the series of V, W, Mo as cathode—an amorphous lithium metal oxide with a metal in the series of Ti, Ta, Nb as electrolyte—and an other amorphous transition metal oxide as anode.

It is advantageous to achieve good capacitor properties, as distinct from a battery/energy storage point of view, that the transition metal oxides are deposited in their amorphous state and remain amorphous instead of crystalline. This is an important distinction from the preferred arrangement used in Li-ion batteries. In their crystalline state the transition metal oxides have a flat voltage profile during charge/discharge which would limit its use as a capacitor. For instance, $V_2O_5$ in its crystalline state has a first voltage plateau at 3.4 V and upon insertion of 0.5 $Li^+$ there is a next plateau 0.4 V lower. If more lithium is inserted to arrive at $LiV_2O_5$ another plateau is reached at even lower voltage. This continues until 0V when 7 $Li^+$ are inserted into the lattice. Upon discharge, however, the structure collapses, becomes amorphous and starts to behave differently: not all the lithium ions can be extracted anymore.

An amorphous transition metal oxide does not show all these discrete voltage steps (see also FIG. 3) and consequently shows a much steeper voltage swing upon charging and decharging. The amount of charge that can be stored is less but still significantly larger than a parallel plate capacitor. A further advantage of using amorphous cathode/anode materials is that the order of deposition can be altered because no high temperature annealing steps are required to obtain the crystalline phase (which is typically done for Li-ion battery applications to crank-up the output voltage to a stable, constant value). Moreover, it is imperative for the electrolyte that it remains amorphous to ensure its Li ion conducting properties. In addition, the absence of high-temperature annealing steps makes it possible to deposit these capacitors on top of CMOS where annealing temperatures typically should not exceed 400° C. to 450° C. maximum. Combining of an ultra high density electrochemical capacitor with other components, on top of an electronic circuit on a common substrate increases the performance. The interconnects are shorter and the overhead for solder bumps or bond-pads is saved. Additional benefits can come from combining process steps or using the same equipment as outlined in the next paragraphs, resulting in lower costs.

One of the advantages of $V_2O_5$ over $LiCoO_2$ is that it can be used both as cathode and anode material whereas $LiCoO_2$ should be used in combination with another transition metal oxide in order to keep the voltage difference large enough and to be able to store charge in the electrochemical cell. This is because $LiCoO_2$ has only one voltage plateau related to the change in oxidation states between $Co^{3+}$ and $Co^{4+}$.

Figure 3:
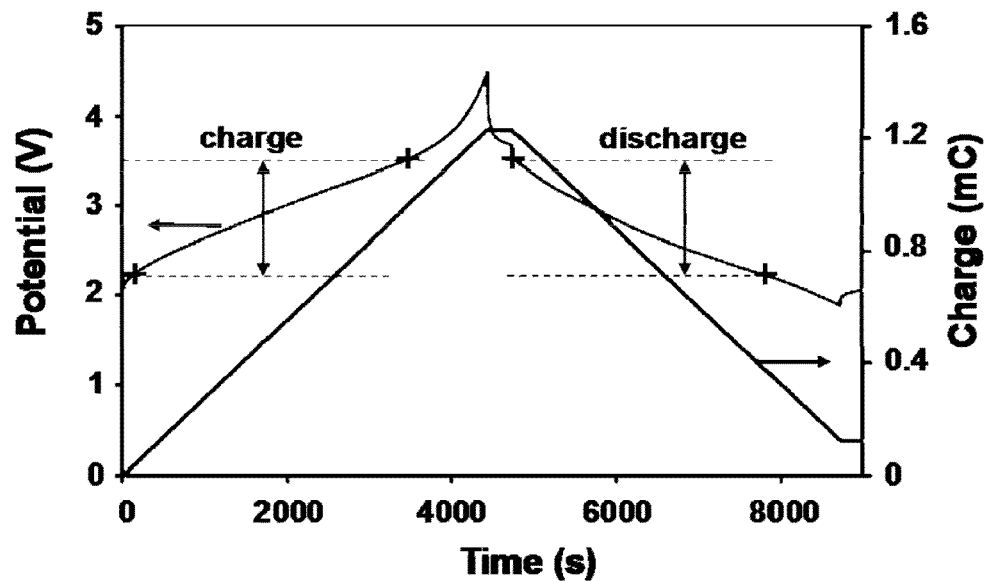
FIG. 3 shows results obtained with an embodiment of the invention.

Although it is advantageous to use electrochemical capacitors with an amorphous cathode from temperature budget point of view, the energy efficiency is lower because of the hysteresis in the lithium insertion reaction for these materials. Efficiencies may be only 80%. For applications as charge pumps or energy storage for energy harvesting and scavenging devices, the energy efficiency is important. Energy dissipated in the charge and discharge cycles is evident as a difference between the charge during the charging cycle (ca. 4.2 mC) and the discharging cycle (ca. −4 mC) voltage gap between the charge and discharge curve such as shown in FIG. 3.

Alternatives to these methods and materials exist. For example, other Li intercalation materials or combinations may be used to create a mixture of multiple possible oxidation states.

Other Li electrolytes may be used, such as $Li_2O-Al_2O_3$, $LiPF_4$, $LiAlF_4$, or $Li_5La_3Ta_2O_{12}$ (Garnet).

The Li-accepting electrodes may be doped to improve stability, for example using Hf or Zr doping of $LiNbO_3$.

Alternative electrode materials, especially for a plating anode, include Al, Cu, Bi, Ni, SnN, $RuO_2$, or Pt.

To improve adhesion, adhesion layers of $TiO_2$/Ti, Ta, TiW, or alternatives may be introduced.

Variations on the process flow include changes to the sequence of deposition, patterning, and etching. For example, rather than using a shadow mask, a layer may be deposited over the complete surface and then patterned.

Further, the capacitor can be combined with dielectric capacitors on the same substrate.

To obtain a 3D surface of increased area, pores or surface structure may be introduced on the electrodes or within the substrate surface itself.

The use of a solid state electrolyte brings specific advantages:
  There is no liquid electrolyte that can leak out and can thus be hazardous. The solid state electrolytes can withstand high processing temperatures (i.e. 300° C. and above) which allows moulding the electrochemical capacitor into SMD packages
  The electrochemical capacitor can be decharged completely without any issue and can be recharged numerous times without any problem (>50000).
  Limited aging and therefore the capacitor has a predictable behavior in an electronic circuit.
  Self-discharge (internal leakage) can be tuned depending on the electrolyte thickness. Unlike parallel plate capacitors the tuning of the dielectric thickness i.e. spacing does not have an impact on the capacitance density.
  Recharging time is very short (can be done at high C-rate i.e. @1000C capacitor will charge in 10s to 80%) without degradation of the electrolyte.
  High peak power can be delivered due to the low internal resistance (thin electrolyte layer).
  If 3D surface-enhancement is employed the peak power for a given area can be further improved. The inventors are not aware of any alternative integrated electrochemical capacitors on silicon/integrated circuits. Integrated decoupling capacitors can have better performance than discrete capacitors where the interconnect inductance limits the lowest impedance.
  The electrochemical capacitor provides higher capacitance densities than known before and due to the limited solid state electrolyte thickness high-frequency properties could be maintained. This is of course at the price of charge retention properties.

Figure 4:
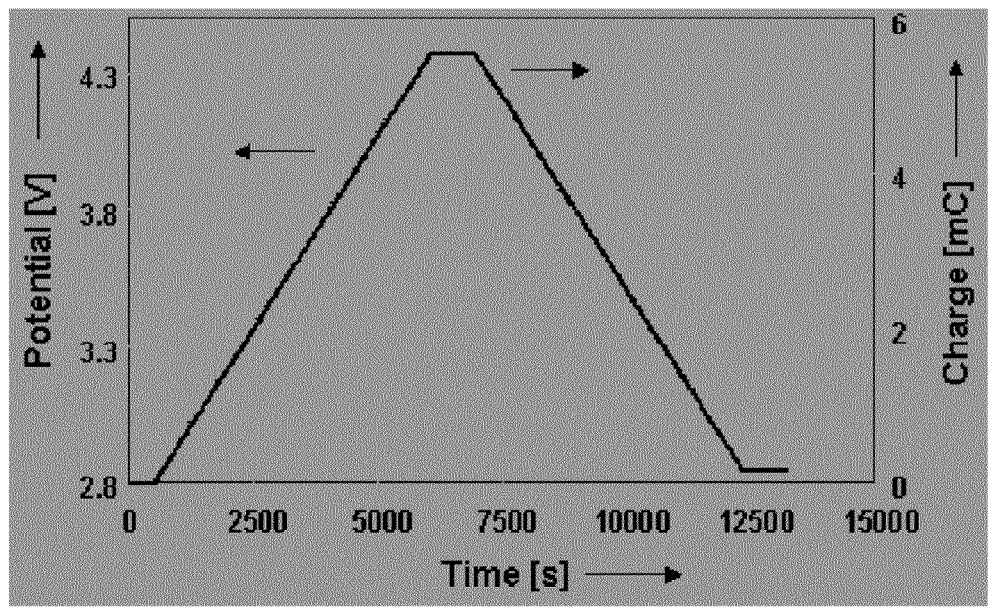
FIG. 4 shows results obtained with a comparative example.

The charge and discharge properties of the electrochemical capacitor are markedly different from a Li-ion solid state battery shown respectively in FIG. 3 and FIG. 4. In the electrochemical capacitor the potential increases between 2V and 4.0 V during charge (0s till 4000s) and discharge (4700s and 8700s). The potential is a function of the total accumulated charge and behaves as a very large parallel plate capacitor would do.

FIG. 3 shows the charge and discharge curve of a 3D $V_2O_5$/LiPON/Li solid state electrochemical capacitor with a surface enlargement of 5×. This 3D electrochemical device can store a charge of about 4 mC per $cm^2$. The black arrow in FIG. 3 indicates the usable voltage range where the device behaves as a linear capacitor i.e. between 2.1V and 3.6V.

FIG. 4 shows the charge and discharge curve of a $LiCoO_2$/LiPO/Li battery which is the typical galvanostatic response of a typical solid state battery with a crystalline cathode where a constant voltage plateau is obtained between 3.6 V and 3.8 V that is independent of the amount of charge. Please note that the voltage rises sharply if the battery starts to accumulate some charge and that the voltage suddenly drops at the end of the discharge cycle. The electrochemical capacitor has a very different curve without such obvious plateaus.

A further benefit of the invention is that the capacitors can have electrostatic discharge (ESD) robustness.

High-density capacitors sometimes have the requirement of withstanding breakdown voltages much higher than the typical application voltage of e.g. 3.3V. This is the case when electrostatic discharge (ESD) events are likely to reach the capacitor. Such events typically last less than a microsecond. The electrochemical capacitor can be tuned to withstand short pulses with high voltage. The solid state electrolyte can be made thicker to withstand higher voltages at the cost of less ion conduction. The electrolyte will then get most of the voltage in the nano-second range of ESD pulses, avoiding unwanted redox-reactions or huge Joule-heating by the overvoltage of an ESD pulse. Since large capacitances are mainly needed at low frequencies below 1 MHz, there is a feasibility window of having a good ESD robustness and at the same time to have a large capacitance value in the frequency range up to 1 MHz.

The electrochemical capacitor provides ultra high capacitance densities ($>>1$ uF/mm$^2$), allowing new functions to be integrated on chip that are currently not feasible. Apart from performance improvement this also results in a significant cost reduction. For instance, a planar electrochemical capacitor with a cathode thickness of 100 nm has a capacity of 45 nWh/mm$^2$ i.e. 0.6 mC/mm$^2$, i.e. more than 1000× larger energy density than the best 3D capacitor.

The solid electrolyte can withstand standard back-end annealing temperatures (i.e up to 450° C.) (during manufacturing/packaging and during operation) without loosing performance due to inherent better stability of the solid state electrolyte compared to liquid electrolytes known from the art The maximum obtainable capacitance density is not dependent on the dielectric thickness but on the cathode thickness. The electrolyte thickness becomes therefore a parameter that can be tuned to optimize breakdown voltage in relation to frequency dependence. This is a dramatically different concept compared to either parallel plate capacitors or solid state batteries.

As the thickness of the solid state electrolyte can be reduced the adverse effect of slow ion conduction can be mitigated which allows application at high frequencies.

Alternatively, a thicker solid state electrolyte gives electrostatic discharge protection since the thicker electrolyte can withstand much higher voltages.

The whole stack can be deposited with standard deposition methods (e.g. physical vapour deposition) and be patterned with standard lithographic techniques.

Unlike standard Li-ion batteries the capacitors can have large voltage drops allowing them to be treated/integrated in standard design flows: behavior comparable to parallel plate capacitors.

Figure 5:
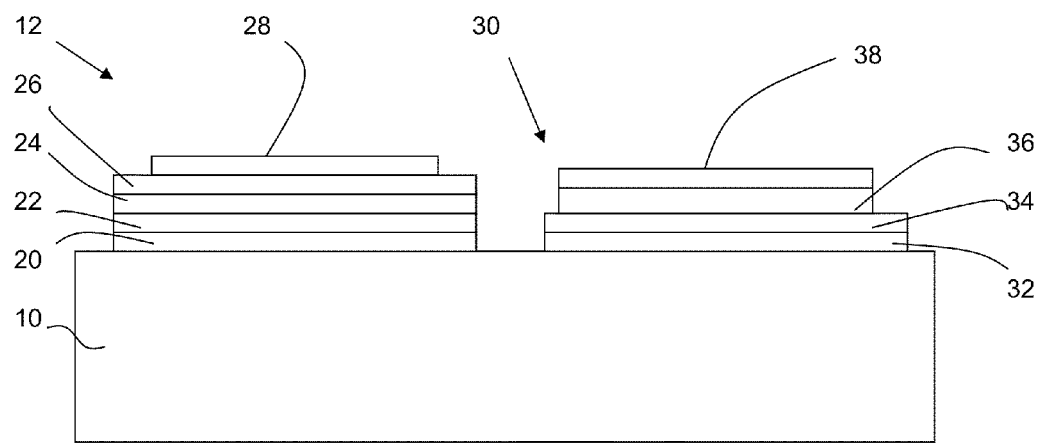
FIG. 5 shows a further embodiment of the invention.

A further development is illustrated in FIG. 5. In this embodiment, a high density capacitor 12 is integrated with a dielectric capacitor 30.

The dielectric capacitor includes an adhesion or barrier layer 32, a lower electrode 34, a dielectric 36 and a top electrode 38.

The two capacitor types may be combined for best decoupling and improved peak power performance. One example is to use the dielectric capacitor for decoupling a high frequency range in combination with the electrochemical capacitor for energy storage.

In a particular embodiment, the adhesion or barrier layer 32 of the dielectric capacitor is of Titanium dioxide (TiO$_2$), and the diffusion barrier layer 20 of the electrochemical capacitor is of TiO$_2$.

A layer of TiO$_2$ can be deposited and then a layer of suitable electrode material, Pt, is deposited. Next, lithography, etching and cleaning steps are performed to leave the TiO$_2$ as the adhesion layer 32 of the dielectric capacitor and also the diffusion barrier layer 20 of the electrochemical capacitor, and the Pt as the lower electrode 22 of the electrochemical capacitor and the lower electrode 34 of the dielectric capacitor.

A high-k dielectric layer, for example of PZT, is deposited to form dielectric 36.

The next steps are annealing, lithography, etching and cleaning. A further lower electrode 22 is provided on the diffusion barrier layer 20 to construct the active Li-intercalating cathode of the electrochemical capacitor. Subsequently a layer to form the solid state electrolyte 24, such as lithium phosphate, LiPON, or LiTaO$_3$ is deposited and patterned using a shadow mask or hard mask as discussed above.

Some of the previous steps may be shared between the processing of the dielectric 36 and solid state electrolyte 24, or performed separately for each capacitor by masking one of the capacitors while processing the other.

The formation of the upper electrode 26 on the electrochemical capacitor then follows by deposition of a suitable material, such as a transition metal oxide, Lithium transition metal oxide, or lithium iron manganese phosphate.

Then, a layer, for example of Pt or Co, may be deposited to form the current collector 28 and also the top electrode 38. If for process compatibility reasons a lower electrode 22 is applied consisting of a transition metal only, e.g. V$_2$O$_5$, a Li containing upper electrode should be applied to ensure that enough lithium is available for charge transfer from one electrode to the other. Lithography, etching and cleaning steps may be carried out in common.

The whole device may then be encapsulated.

The choice of materials for the combined arrangement is not necessarily the same as the choice when making only an electrochemical capacitor because of the importance of ensuring that the performance of both capacitors is optimised. For example, Pt is particularly suited as the metal of the current collector 28, top electrode 38, and lower electrodes 22,34, since it is compatible as electrode material with ferroelectric dielectrics due to its resistance against oxidation during high temperature annealing that is required to obtain a high permittivity dielectric phase. If medium k dielectric materials are employed like aluminum oxide, hafnium oxide, zirconium oxide, tantalum oxide, niobium oxide, titanium oxide, ternary combinations of the before mentioned oxides and/or doped versions of the before mentioned oxides with elements from the lanthanide series other electrode materials, like TiN, can be used that are more cheap and more easy to process than for instance Pt.

Figure 6:
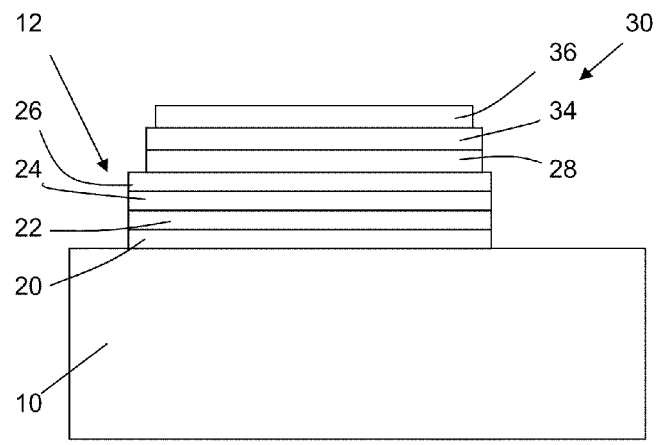
FIG. 6 shows a yet further embodiment of the invention.

FIG. 6 illustrates an alternative implementation where the capacitors 12, 30 are stacked on top of each other. The layers used are the same as in FIG. 5 so the same reference numbers are used and the descriptions will not be repeated. Note that the current collector 28 of the lower capacitor functions as the lower electrode 32 of the upper (dielectric) capacitor.

The stacking of capacitors one on the other reduces surface area.

A number of variations exist. Capacitor 30 may be below capacitor 12 for example if capacitor 30 requires higher processing temperatures. Additional barrier layers may be inserted as required.

Although the embodiment described teaches the use of lithium ions, other metallic ions such as sodium may be used in some cases.

Electrodes and or current collectors may be of vanadium, titanium, tantalum, zirconium, hafnium, niobium, and the nitrides thereof.

The dielectric of capacitor 30 may contain oxides or nitrides, including complex oxides such as ferroelectrics or other materials with a high dielectric constant. Examples are titanates such as PZT (lead zirconate titanate) and doped PZT, BST (Barium Strontium Titanates) and doped BST, Niobates, Tantalates, Zirconates. The dielectric might contain further the elements Si, Hf, Zr, Ti, Ta, La, Nb, Pb, Sr, Ba, Bi, or combinations thereof with additions of V, Y, Cr, Mn, Mg, Ca, Fe, Ni, Mo in the form of oxides or nitrides.

Integration of electrochemical capacitors with dielectric capacitors supplies radio frequency decoupling over a large bandwidth.

The capacitors described may be integrated with other semiconductor processing, including in particular CMOS processing.

The invention claimed is:

1. An electrochemical capacitor, comprising:
    a substrate;
    a diffusion barrier layer positioned over the substrate;
    a cathode positioned over the diffusion barrier layer;
    an anode positioned over the cathode;
    and an electrolyte allowing migration of metal ions between the anode and the cathode;
    wherein the electrolyte is an amorphous solid state electrolyte; and
        at least one of the anode and the cathode has multiple, non discrete oxidation states having a broad, continuous distribution of redox potentials, wherein the at least one of the anode and the cathode is made of an oxide containing three different metals.

2. An electrochemical capacitor according to claim 1, wherein the thickness of the amorphous solid state electrolyte is 100 to 600 nm.

3. An electrochemical capacitor according to claim 2, wherein at least one of the anode and cathode is formed of a compound of a transition metal with multiple oxidation states.

4. An electrochemical capacitor according to claim 3 wherein the compound of a transition metal with multiple oxidation states is a non-crystalline material, an amorphous material, and/or a material with a defective structure.

5. An electrochemical capacitor according to claim 4 wherein the compound of a transition metal with multiple oxidation states is the non-crystalline material.

6. An electrochemical capacitor according to claim 4 wherein the compound of a transition metal with multiple oxidation states is the amorphous material.

7. An electrochemical capacitor according to claim 4 wherein the compound of a transition metal with multiple oxidation states is the material with a defective structure.

8. An electrochemical capacitor according claim 3 wherein the compound of a transition metal with multiple oxidation states is a Li- or Li ion intercalating material.

9. An electrochemical capacitor according to claim 8, wherein the cathode is an amorphous transition metal oxide, a lithium transition metal oxide or an amorphous lithium transition metal phosphate doped with at least one other transition metal, the metals being nickel, cobalt, iron, manganese, chromium, vanadium, molybdenum, tungsten.

10. An electrochemical capacitor according to claim 1, wherein the anode is an amorphous transition metal oxide, lithium transition metal oxide, or an amorphous lithium transition metal phosphate doped with at least one other transition metal, the metals being nickel, cobalt, iron, manganese, chromium, vanadium, molybdenum or tungsten, or a copper or bismuth layer on which metallic lithium is deposited during charging.

11. An electrochemical capacitor according to claim 1 wherein the amorphous solid state electrolyte is lithium titanate, lithium tantalate, lithium niobate, lithium phosphorous oxide, or lithium phosphorous oxynitride.

12. A device, comprising an electrochemical capacitor according to claim 1 and a dielectric capacitor formed on a common substrate, wherein the dielectric capacitor comprises a lower electrode, an upper electrode and a dielectric layer between the upper and lower electrodes.

13. An electrochemical capacitor according to claim 1, wherein the diffusion barrier layer is made of material selected from a group consisting of titanium nitride, titanium oxide, aluminum oxide, tantalum oxide and tantalum nitride.

14. An electrochemical capacitor according to claim 1, wherein the cathode comprises an amorphous transition metal compound that includes tungsten.

15. An electrochemical capacitor according to claim 14, wherein the cathode comprises amorphous tungsten oxide.

16. The electrochemical capacitor of claim 1, wherein the oxide comprises $LiCoMnO_x$.

17. The electrochemical capacitor of claim 1, wherein the oxide is deposited in an amorphous state and remains amorphous instead of crystalline.

18. A solid state electrochemical capacitor arrangement, comprising:
    a substrate;
    a plurality of semiconductor components; and
    at least one solid state electrochemical capacitor including:
    a diffusion barrier layer positioned over the substrate;
    a cathode positioned over the diffusion barrier layer;
    an anode positioned over the cathode;
    and an electrolyte allowing migration of metal ions between the anode and the cathode;
    wherein the electrolyte is an amorphous solid state electrolyte; and
    at least one of the anode and the cathode has multiple, non discrete oxidation states having a broad, continuous distribution of redox potentials, wherein the at least one of the anode and the cathode is made of an oxide containing three different metals.

19. A solid state electrochemical capacitor arrangement according to claim 18, wherein the thickness of the amorphous solid state electrolyte is 100 to 1000 nm.

20. A solid state electrochemical capacitor arrangement according to claim 18, wherein the plurality of semiconductor components includes a dielectric capacitor, the at least one solid state electrochemical capacitor and the dielectric capacitor being stacked on top of each other.

* * * * *